Patented Sept. 17, 1935

2,015,045

UNITED STATES PATENT OFFICE 2,015,045

INSECTICIDE AND FUNGICIDE

Charles F. Teichmann, New York, N. Y., assignor to The Texas Company, New York, N. Y., a corporation of Delaware No Drawing. Application December 3, 1932, Serial No. 645,589

8 Claims. (Cl. 167—30)

This invention relates to insecticides and fungicides and more particularly to insecticides and fungicides comprising phenolic derivatives of naphthenic acids and petroleum hydrocarbons.

More specifically, my invention relates to the preparation of oil-soluble insecticides and fungicides by reacting phenolic compounds with naphthenic acids to form the corresponding phenol naphthenates and then dissolving these naphthenates in a petroleum hydrocarbon oil; the solution so formed is an extremely efficient and toxic insecticide and fungicide.

The phenol naphthenates used in the preparation of the insecticides and fungicides disclosed in this invention may be prepared from either low viscosity naphthenic acids such as are recoverable from kerosene distillates and light lubricating oils, or from the high viscosity acids which are recovered from highly viscous lubricating oil distillates. The desired phenol naphthenates may be prepared from any of the naphthenic acids by reacting them with phenolic bodies of either the mono or poly-hydroxy types preferably phenol, the various cresols, dihydric phenols such as catechol, resorcinol and hydroquinone, trihydric phenols including pyrogallol and phloroglucinol as well as any of the homologues of the aforementioned phenolic compounds. The phenolic compounds recoverable from petroleum products by means of alkaline treating reagents may also be used advantageously in the preparation of the phenol naphthenates. For the purpose of brevity, the phenolic compounds will hereafter be spoken of as phenols.

Any one of the accepted methods of esterification may be used in the reaction of the phenols with the naphthenic acids. The most desirable method consists in reacting a given quantity of the naphthenic acids with an excess of phenols at elevated temperatures and preferably under a vacuum. Dry hydrochloric gas is an excellent catalyst for this reaction and in its presence the phenols and naphthenic acids may be condensed very efficiently.

Although dehydrating agents such as concentrated sulfuric acid may be quite effective in bringing about the interaction of the phenols and naphthenic acids, it is possible to attain the same results by operating in a vacuum apparatus making provision for the withdrawal in vapor form of the water which is formed as the by-product of the esterification.

The phenol esters of naphthenic acids may also be prepared by the method well known in the art of reacting the acid chlorides with phenols in the presence of an alkaline material which serves to neutralize the free hydrochloric acid liberated in the course of the reaction. As an example of this method of synthesis, a quantity of naphthenic acids is refluxed with an excess of thionyl chloride at an elevated temperature whereby the corresponding acid chlorides of the naphthenic acids are obtained. The so-formed acid chlorides are separated from any remaining thionyl chloride and are then reacted with the proper phenol in the presence of potassium carbonate whereby the desired phenol naphthenates are obtained. The hydrochloric acid formed in the course of the reaction reacts with the potassium carbonate to yield potassium chloride and carbon dioxide.

The esters obtained from the interaction of the phenols and the naphthenic acids may be separated from the unreacted phenols and naphthenic acids either by a carefully controlled distillation and fractionation or by extraction with a suitable selective solvent. In their purified form, they will have varying physical characteristics due to the fact that the molecular weights of the naphthenic acids from which they are prepared may differ widely. These physical characteristics do not detract in any way from the valuable insecticidal and fungicidal characteristics of these materials. One explanation for the insecticidal and fungicidal properties of the phenol naphthenates appears to be that both the phenol and naphthenate radicals have desirable insecticidal and fungicidal properties.

The phenol naphthenates are substantially insoluble in water and, when brought into contact with plants, they do not exert any harmful effect on the plant structures and they may remain in contact with the leaves over an extended period of time without affecting them deleteriously.

When a limited percentage of the phenol naphthenates is dissolved in petroleum hydrocarbons, it is possible to prepare an extremely active insecticide and fungicide. Under certain conditions it may be desirable to atomize the hydrocarbon oil solution of the phenol naphthenates to form a fog and to subject insect-infested plants or trees to the action of such fogs. Under certain conditions, it is inadvisable or impossible to follow such a method of applying the insecticide in which case it may be more desirable to emulsify the solution of phenol naphthenates in petroleum hydrocarbon oils with a suitable amount of water and then to spray the plant life with the emulsion. In this manner it is possible to film over the entire plant with the emulsion of phenol naphthenates, petroleum hydrocarbon oil and water. Under normal conditions, the water evaporates quite rapidly leaving a film of petroleum hydrocarbon oil and dissolved phenol naphthenates.

In preparing the emulsions of the hydrocarbon oil solutions of phenol naphthenates in water, various emulsifying agents may be used with advantage. Among these may be enumerated the alkali metal salts of the various fatty acids as well as of the naphthenic acids recovered from petroleum. The soaps of triethanolamine, finely divided adsorbent materials such as fuller's earth, bentonite and the like, as well as those gums which are well known as stabilizing agents may also be used. An example of a suitable emulsion base which may be diluted with from 50 to 100 parts of water for use is as follows:

| | Per cent |
|---|---|
| Phenol naphthenates | 10 |
| Light lubricating oil | 60 |
| Sodium naphthenate | 5 |
| Water | 25 |

An emulsion base stabilized with fullers earth may have the following constitution:

| | Per cent |
|---|---|
| Phenol naphthenates | 10 |
| Mineral oil | 70 |
| Water | 15 |
| Fullers earth | 5 |

This base may be diluted with from 50 to 100 volumes of water for the preparation of an emulsion suitable for applying to plants and trees.

In preparing the petroleum hydrocarbon solutions of phenol naphthenates, a large variety of petroleum derivatives may be used. So, for example, kerosene distillates, light and heavy lubricating oils which may or may not be cut back or diluted with lighter hydrocarbons may find ready application. The hydrocarbons may or may not have been subjected to refining treatments and, in some cases, they may be the residues or by-products of certain refining treatments, for example, certain of the extracts obtained in treating hydrocarbon oils with selective solvents may be very well adapted for use in the insectitides embodied in my invention.

Obviously many modifications and variations of the invention, as hereinbefore set forth, may be made without departing from the spirit and scope thereof, and therefore only such limitations should be imposed as are indicated in the appended claims.

I claim:

1. An insectitide and fungicide comprising a mixture of phenol naphthenates and a petroleum hydrocarbon oil.

2. An insecticide and fungicide comprising a petroleum hydrocarbon oil, water, phenol naphthenate and an emulsifying agent.

3. An atomizable insecticide and fungicide comprising a solution of phenol naphthenates in a light petroleum hydrocarbon oil.

4. An insecticide and fungicide comprising a petroleum hydrocarbon oil, water, phenol naphthenates and sodium naphthenate.

5. An insecticide and fungicide comprising phenol naphthenates, petroleum hydrocarbon oil, water and a finely divided solid emulsifying agent.

6. An insecticide and fungicide emulsion containing from 0.5% to 5% of an insecticide base consisting of phenol naphthenates, petroleum hydrocarbon oil, an emulsifying agent and from 95 to 99.5% of water.

7. An insecticidal and fungicidal emulsion base comprising 10% of phenol naphthenates, 70% petroleum hydrocarbon oil, 15% water and 5% fullers earth.

8. An insecticidal and fungicidal emulsion consisting of the emulsion base described in claim 7 diluted with from 50 to 100 volumes of water.

CHARLES F. TEICHMANN.